United States Patent
Smith et al.

(10) Patent No.: US 10,965,189 B2
(45) Date of Patent: Mar. 30, 2021

(54) ACTUATOR FOR A DRUG ADMINISTRATING DEVICE

(71) Applicant: Bühler Motor GmbH, Nuremberg (DE)

(72) Inventors: Christopher Smith, Raleigh, NC (US); Cory Taylor, Apex, NC (US); Christopher Wooten, Cary, NC (US)

(73) Assignee: BÜHLER MOTOR GMBH, Nuremberg (DE)

( * ) Notice: Subject to any disclaimer, the term of this patent is extended or adjusted under 35 U.S.C. 154(b) by 120 days.

(21) Appl. No.: 16/539,104

(22) Filed: Aug. 13, 2019

(65) Prior Publication Data
US 2021/0050763 A1 Feb. 18, 2021

(51) Int. Cl.
| | | |
|---|---|---|
| *H02K 7/116* | (2006.01) | |
| *H02K 5/22* | (2006.01) | |
| *H02K 11/33* | (2016.01) | |
| *H02K 7/00* | (2006.01) | |

(52) U.S. Cl.
CPC ............ *H02K 7/116* (2013.01); *H02K 5/225* (2013.01); *H02K 7/003* (2013.01); *H02K 11/33* (2016.01)

(58) Field of Classification Search
None
See application file for complete search history.

(56) References Cited

U.S. PATENT DOCUMENTS

| | | | | |
|---|---|---|---|---|
| 5,581,138 A | * | 12/1996 | Tukamoto | F16H 21/40 310/38 |
| 5,717,265 A | * | 2/1998 | Tukamoto | F16H 21/40 310/38 |
| 6,097,123 A | * | 8/2000 | Weiss | F16K 31/047 251/129.13 |
| 8,011,136 B2 | * | 9/2011 | Fukumura | E05F 15/646 49/360 |
| 9,114,798 B1 | * | 8/2015 | Fox | B62D 11/003 |
| 9,365,343 B2 | * | 6/2016 | Klemm | H02K 7/116 |
| 10,288,339 B2 | * | 5/2019 | Saito | H02K 11/0094 |
| 10,498,190 B2 | * | 12/2019 | Xiong | H02K 11/30 |
| 10,766,566 B2 | * | 9/2020 | Capozzella | H02K 7/14 |
| 10,876,595 B2 | * | 12/2020 | Sugiyama | H02K 7/1166 |
| 2017/0317554 A1 | * | 11/2017 | Yokoyama | G01D 11/16 |
| 2018/0083507 A1 | * | 3/2018 | Tokizaki | B60S 1/26 |

* cited by examiner

Primary Examiner — Robert W Horn
(74) Attorney, Agent, or Firm — Westerman, Hattori, Daniels & Adrian, LLP

(57) ABSTRACT

An actuator unit includes a support plate having a first side and a second side; an electric motor with terminal lugs and a motor shaft; a motor mounting pocket on the first side, the motor mounting pocket accommodating the electric motor; mounting projections on the first side, the mounting projections including a plurality of clamping pockets; a PC-board insertion slot on the first side; a motor shaft passage from the first side to the second side; the motor shaft of the electric motor projecting from the first side through the shaft passage to the second side and carrying a pinion; a multistage reduction gear arranged on the second side and meshing with the pinion; and a plurality of conductor stampings fixed in the clamping pockets and connected with the terminal lugs of the electric motor.

18 Claims, 10 Drawing Sheets

ACTUATOR FOR A DRUG ADMINISTRATING DEVICE

BACKGROUND OF THE INVENTION

(1) Field of the Invention

The present invention relates to actuators used in medical devices for administering drugs to a human being.

(2) Description of the Related Art Including Information Disclosed Under 37 CFR 1.97 and 1.98

There are actuator units comprising a carrier housing, an electric motor with terminal lugs connected to terminal stampings, an output shaft with a pinion projecting from a first side through the shaft passage to a second side of the carrier housing, a multi stage gear, a cover enclosing the gear and conductor stampings. This design needs a complex insert molding process.

BRIEF SUMMARY OF THE INVENTION

Preferred embodiments of the present invention provide an actuator which is simple in structure, capable of reliably fixing the motor, the gear wheels and the conductor stampings and secures them in a compact assembly to be completed with an application component such as a medical device. The application component comprises for example a spindle coupled with a plunger pump containing a drug, control means, a syringe and a user interface. The actuator unit and the application unit are normally produced at different locations. Therefore mounted components of the actuator unit should be fixed securely.

Therefore the object of the present invention is to provide an actuator unit which is composed of easily producible and mountable components which are securely fixed until the final assembly, whereby the actuator has a compact and space-saving design and a reduced number of parts.

The double-sided support plate of the actuator unit has various pockets and projections serving as holding means. The electric motor is accommodated in a motor mounting pocket. Mounting projections are equipped with clamping pockets for receiving conductor stampings. A PC-board insertion slot accommodates a pc-board in a space-saving manner. Both sides of the support plate has pockets for the accommodation of gear wheels and other parts. The conductor stampings comprising terminal lugs which contacts the motor terminals and in addition to that holds the motor without any play. A motor shaft passage allows arrangement of the electric motor on the first side of the support plate and arrangement of the gear parts on the second side of the support plate. A plurality of catches allows a mechanical connection with an application device.

The support plate has a pocket for the accommodation of an output gear on the first side with a breakthrough passing through the first and second sides for a output gear, which is meshing the reduction gear arranged on the second side of the support plate. The breakthrough allows the gear to be arranged partly on the first side and partly on the second side of the support plate. This allows optimization of the compactness of the actuator. To secure the output gear in its mounted position, the carrier housing has mounting means for holding the output gear in the pocket.

In a beneficial way a retaining washer is fixed on the mounting means to build a form fit between the output gear and the retaining washer. The retaining washer is fixed by fastening posts that are molded in one piece with the carrier housing. This reduces the number of parts and facilitates the mounting of the output gear.

It is proposed that the retaining washer has lateral projections comprising recesses and clamping lugs. The lateral projections serve as stoppers to maintain play between the output gear and the retaining washer. The space between the clamping lug and the facing part of the retaining washer is less than the diameter of the fastening post. This results in a self-reinforcing clamping effect.

Further a cover is mounted at the support plate for enclosing the reduction gear. The preferred joining process for this is ultrasonic welding, because this is a well-known method.

The conductor stampings are equipped with lugs inserted into the clamping pockets. This allows an easy mounting process and a reduction of parts, because the conductor stampings serves as a power line and a holding component for the electric motor and the clamping pockets are molded in one piece with the support plate.

To improve the holding properties of the conductor stampings on the clamping pocket, the lugs are equipped with clamping means and/or hooks. The clamping means may be formed like a saw-tooth outline.

Furthermore the conductor stampings have four bending edges, wherein the first bending edge is arranged close to the pc-board insertion slot, the second and the third bending edges are arranged close to the second clamping pocket and the fourth bending edge is arranged close to the third clamping pocket. These shapes helps to adapt the conductor stampings to the shape of the support plate and the electric motor.

To allow an easy mounting and the realizing of a form fit, the conductor stampings have constrictions at the second bending edge and adjacent areas between the first lug and the second bending edge, whereby the constrictions are narrower than a bottleneck or have the same width as the bottleneck. Therefore the constrictions allow joining of the conductor stampings and the clamping means generates a form fit within the clamping pockets.

That's why the clamping pockets have a T-shaped cross-section. Due to lack of space the first lug of each conductor stamping is adjacent to a lateral bending edge. At this position they are inserted in first clamping pockets.

Apart from that the conductor stampings are equipped with motor contacts and pc-board contacts. The pc-board contacts are sliding contacts. The motor contacts are realized by clamping lugs.

For economical reasons it is intended that the mounting direction of the electric motor is parallel to the mounting direction of the PC-board and the mounting direction of the conductor stampings.

A plurality of catches are molded in one piece with the support plate. These catches allows an easy mounting of an application unit. This may be a drug dispensing positive displacement pump or the like.

BRIEF DESCRIPTION OF THE SEVERAL VIEWS OF THE DRAWINGS

An embodiment of the invention is explained in greater detail below with reference to the drawing. Wherein.

DETAILED DESCRIPTION OF THE INVENTION

Figure 1:
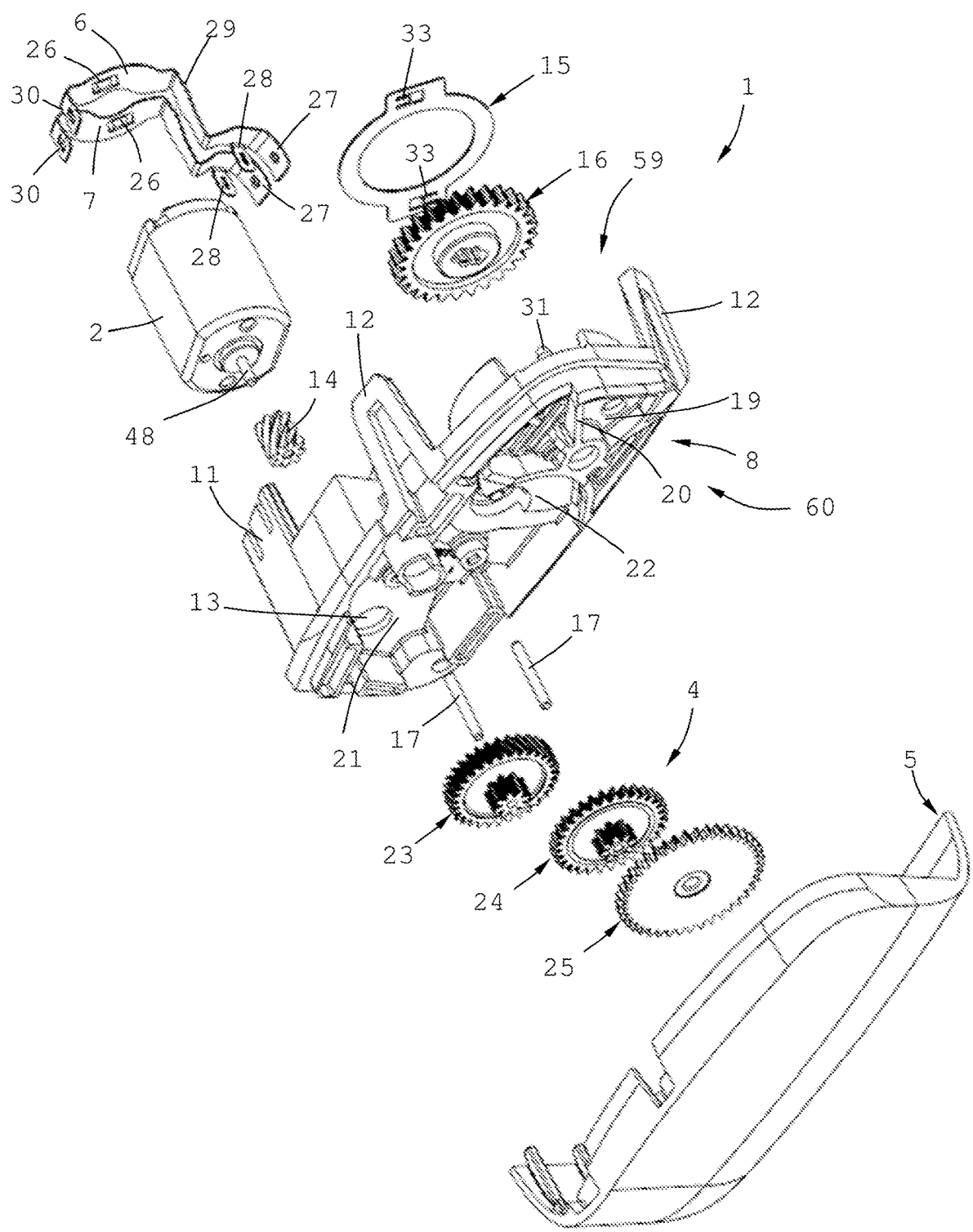
FIG. 1 is an exploded perspective view of an actuator unit.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 is an exploded perspective view of an actuator unit 1, composed of a cover 5, reduction gears 4, with a compound helical wheel 23, a first compound gear 24 and a second compound gear 25, shafts 17, a support plate 8, a pinion 14, an electric motor 2, a first conductor stamping 6, a second conductor stamping 7, an output gear 16, and a retaining washer 15. The support plate 8 consists of a main plane 19, a mounting projection 11 for fastening of the conductor stampings 6, 7, reinforcing ribs 20, a motor shaft passage 13, a first pocket 21 for accommodation of the compound worm wheel 23, a second pocket 22 for accommodation of the second compound gear 25 and catches 12 for mounting an application part (not shown). The conductor stampings 6, 7 have motor contacts 26, pc-board contacts 27, first lugs 28, second lugs 29 and third lugs 30. The retaining washer 15 has a couple of clamping lugs 33 for mounting same on fastening posts 31 of the support plate 8.

Figure 2:
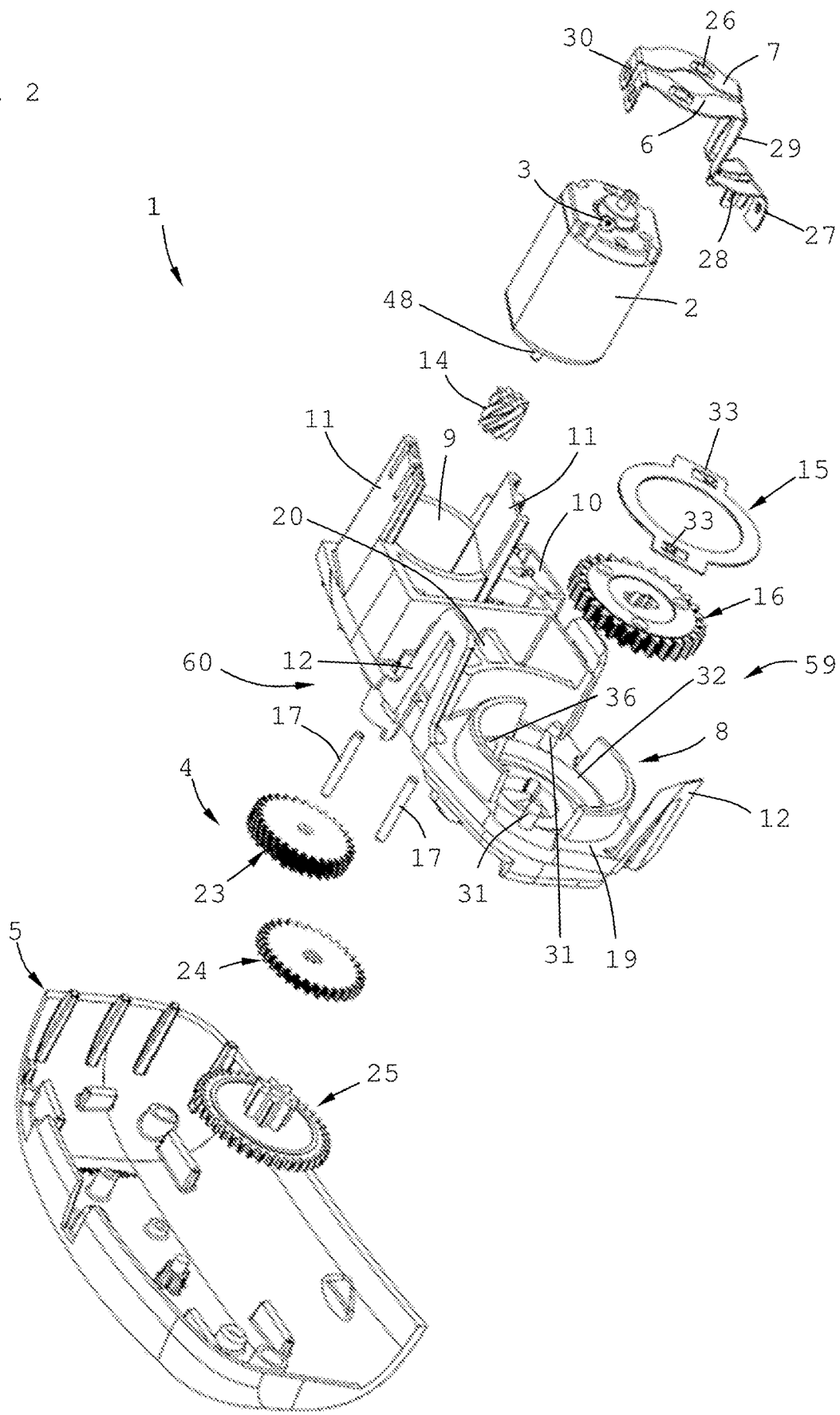
FIG. 2 is a further exploded perspective view of the actuator unit.

FIG. 2 is a further exploded perspective view of the actuator unit 1, composed of a cover 5, reduction gears 4, with a compound helical wheel 23, a first compound gear 24, and a second compound gear 25, shafts 17, a support plate 8, a pinion 14, an electric motor 2, a first conductor stamping 6, a second conductor stamping 7 an output gear 16 and a retaining washer 15. The support plate 8 consists of a main plane 19, mounting projections 11 for fastening of the conductor stampings 6, 7, reinforcing ribs 20, a motor shaft passage 13, a pc-board insertion slot 10, a third pocket 32 for accommodation of the output gear 16, catches 12 for mounting an application part (not shown). The conductor stampings 6, 7 have motor contacts 26, pc-board contacts 27, first clamping lugs 28, second clamping lugs 29 and third clamping lugs 30. The retaining washer 15 has a couple of clamping lugs 33 for mounting same on fastening posts 31.

With reference to FIGS. 1 and 2, the double-sided support plate 8 of the actuator unit 1 has various pockets 37, 38, 39 and projections 11 serving as holding means. The electric motor 2 is accommodated in a motor mounting pocket 9. Mounting projections 11 are equipped with clamping pockets 37, 38, 39 for receiving conductor stampings 6, 7. A PC-board insertion slot 10 accommodates a pc-board 43 (FIG. 16) in a space-saving manner. Both sides of the support plate 8 have pockets 21, 22 for the accommodation of gear wheels and other parts. The conductor stampings 6, 7 receive terminal lugs 3 which constitute the motor terminals and in addition to that hold the motor without any play. A motor shaft passage 13 allows arrangement of the electric motor 2 on the first side 59 of the support plate 8 and arrangement of gear parts on the second side 60 of the support plate 8. A plurality of catches 12 allows a mechanical connection with an application.

The support plate 8 has a pocket 32 for the accommodation of an output gear 16 on the first side 59 with a breakthrough 36 through to the second side for the output gear 16, which is meshing with the reduction gear 4 arranged on the second side 60 of the support plate 8. The breakthrough allows the gear to be arranged partly on the first side 59 and partly on the second side 60 of the support plate 8. This allows optimization of the compactness of the actuator 1. To secure the output gear 16 in its mounted position, the carrier housing 8 has mounting means for holding the output gear 16 in the pocket 32.

Figure 3:
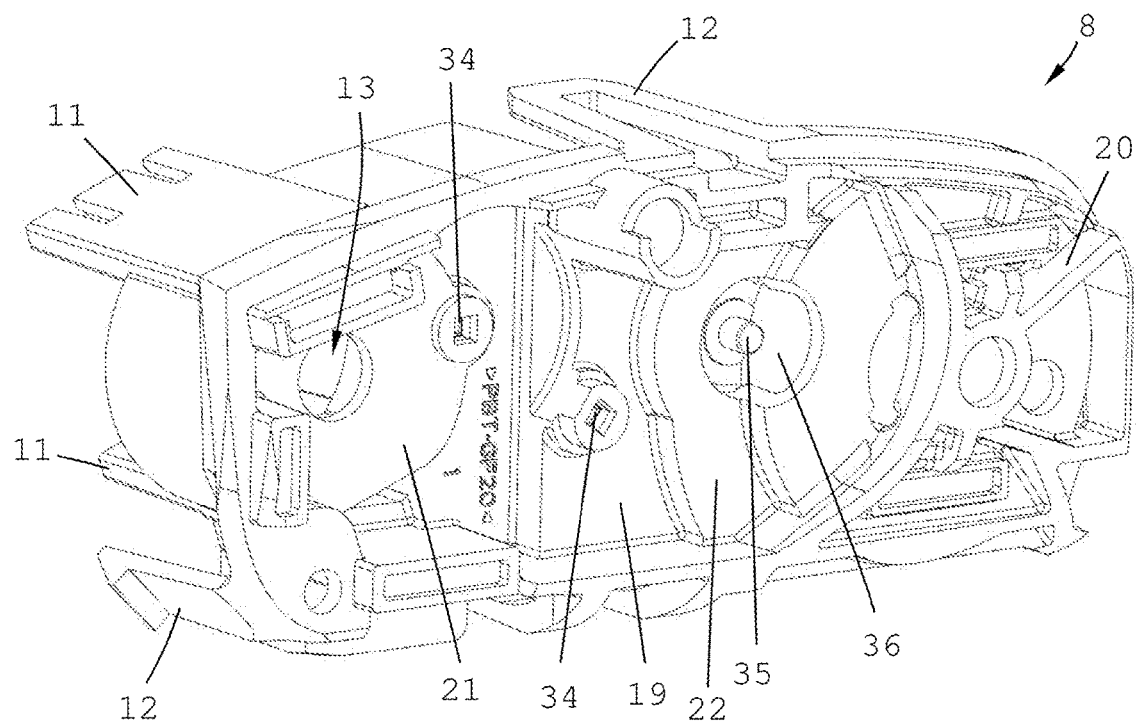
FIG. 3 is a perspective view of a support plate.

FIG. 3 is a perspective view of a support plate 8, with the main plane 19, a first pocket 21 for the compound helical wheel, two pin receptions 34, the motor shaft passage 13, reinforcing ribs 20, the catches 12, the mounting projections 11, a projecting pin 35 for reception of the second compound gear, a breakthrough 36 through which the output gear is engaged with the second compound gear (not shown).

Figure 4:
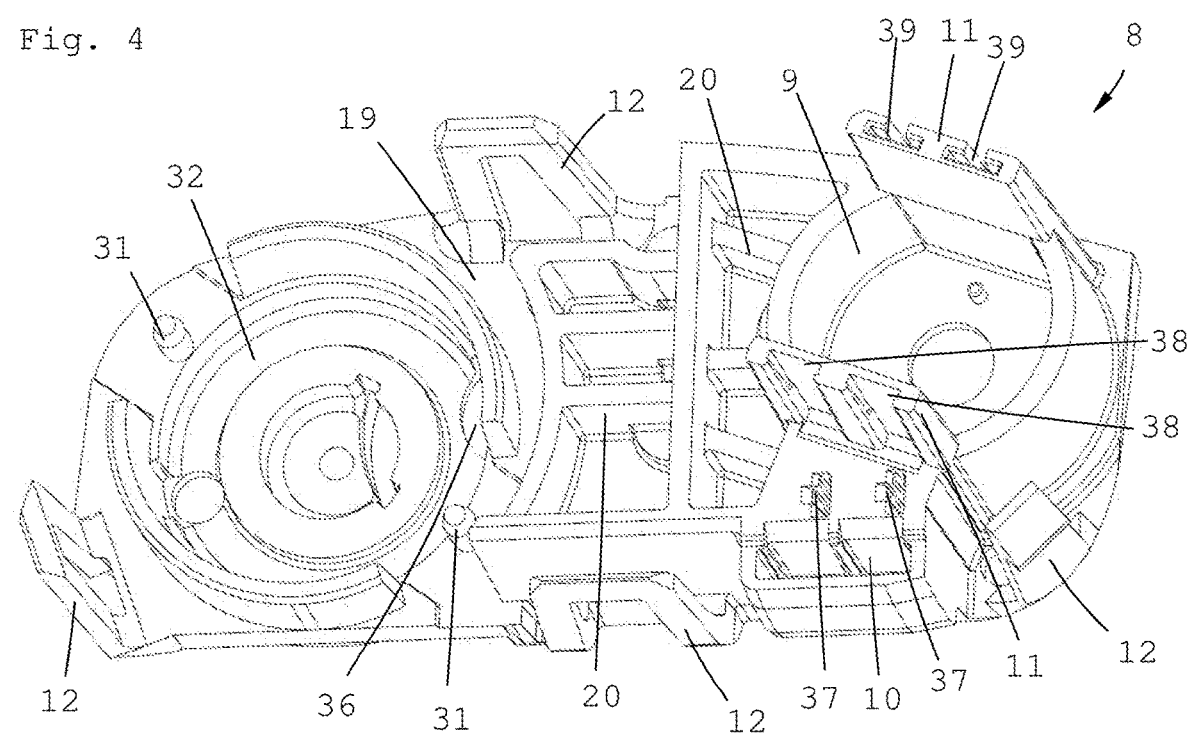
FIG. 4 is a further perspective view of the support plate.

FIG. 4 is a further is a further perspective view of the support plate 8, with the main plane 19, a third pocket 32, fastening posts 31 for mounting the retaining washer, the breakthrough 36, reinforcing ribs 20, the pc-board insertion slot 10, the catches 12, the motor mounting pocket 9 and the mounting projections 11. The mounting projections 11 have first clamping pockets 37 and second clamping pockets 38. Third clamping pockets 39 are arranged between the mounting projections 11 and the pc-board insertion slot 10. The first clamping pockets 37, the second clamping pockets 38 and the third clamping pockets 39 are used for clamping the conductor stampings.

Figure 5:
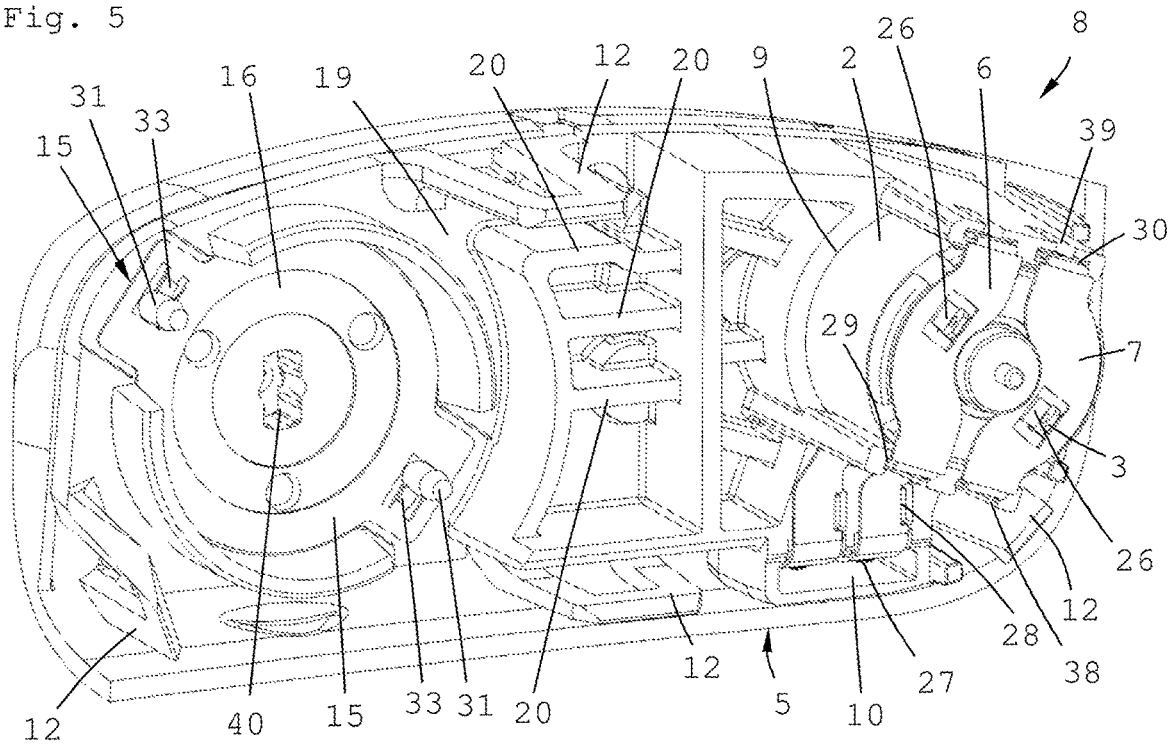
FIG. 5 is a partly assembled perspective view of the actuator unit.

FIG. 5 is a partly assembled perspective view of the actuator unit 1, with the cover 5, the support plate 8, with the main plane 19, reinforcing ribs 20, catches 12, the electric motor 2, accommodated in the motor mounting pocket 9, the conductor stampings 6, 7, whereby conductor stamping 6 is not identical to conductor stamping 7, the pc-board insertion slot 10 and the output gear 16, secured by the retaining washer 15, whereby the clamping lugs 33 of the retaining washer 15 are mounted onto the fastening posts 31. The output gear 16 shows a central hole formed as a polygonal coupling socket 40. The coupling socket 40 is a mechanical interface between the output gear 16 and an application part on which the actuator unit 1 will be mounted later on. The coupling socket 40 may be coupled to a spindle gear which drives a piston of a drug delivering device. First lugs 28 of the conductor stampings are inserted in the first clamping pockets (not visible), second lugs 29 are inserted in second clamping pockets 38 and third lugs 30 are inserted in third clamping pockets 39. The electric motor 2 is connected by motor contacts 26 as part of the conductor stampings 6, 7, which are engaged with terminal lugs 3.

Figure 6:
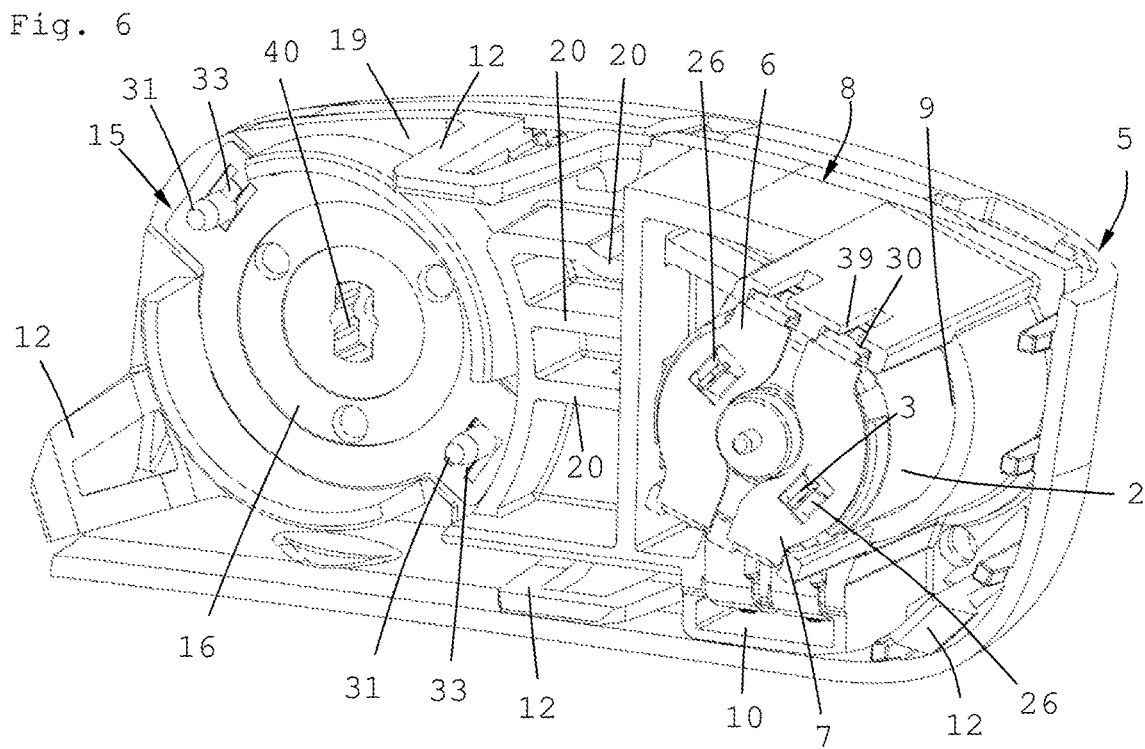
FIG. 6 is a further partly assembled perspective view of the actuator unit.

FIG. 6 is a further partly assembled perspective view of the actuator unit 1, with the cover 5, the support plate 8, with the main plate 19, reinforcing ribs 20, catches 12, the electric motor 2 accommodated in the motor mounting pocket 9, the conductor stampings 6, 7, the pc-board insertion slot 10 and the output gear 16, secured by the retaining washer 15, whereby the clamping lugs 33 of the retaining washer 15 are mounted onto the fastening posts 31. The output gear 16 shows a central hole formed as a polygonal coupling socket 40. Third lugs 30 of the conductor stampings 6, 7 are inserted in third clamping pockets 39. The electric motor 2 is connected by motor contacts 26 as part of the conductor stampings 6, 7, which are engaged with terminal lugs 3.

With reference to FIGS. 5 and 6, in a beneficial way a retaining washer 15 is fixed on the mounting means to build a form fit between the output gear 16 and the retaining washer 15. The retaining washer 15 is fixed by fastening posts 31 that are molded in one piece with the carrier housing 8. This reduces the number of parts and facilitates the mounting of the output gear 16.

The conductor stampings 6, 7 are equipped with lugs 28, 29, 30 inserted into the clamping pockets 37, 38, 39. This allows an easy mounting process and a reduction of parts, because the conductor stampings serve as a power line and a holding component for the electric motor 2 and the clamping pockets are molded in one piece with the support plate 8. To improve the holding properties of the conductor stampings 6, 7 on the clamping pockets 37, 38, 39, the lugs 28, 29, 30 are equipped with clamping means 45, 46, 47 and/or hooks 55, 56. The clamping means may be formed like a saw-tooth outline.

Figure 7:
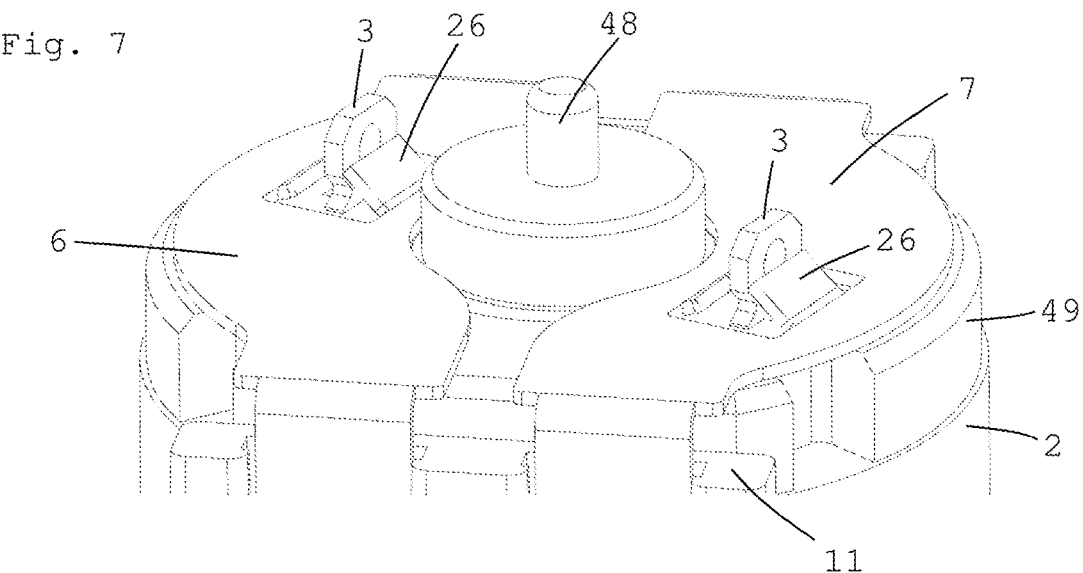
FIG. 7 is a partial view of motor terminal lugs.

FIG. 7 is a partial view of motor terminal lugs 3 which are connected via motor contacts of the conductor stampings 6, 7. FIG. 7 further shows a mounting projection, a motor shaft 48 and an end shield 49 of the electric motor 2.

Figure 8:
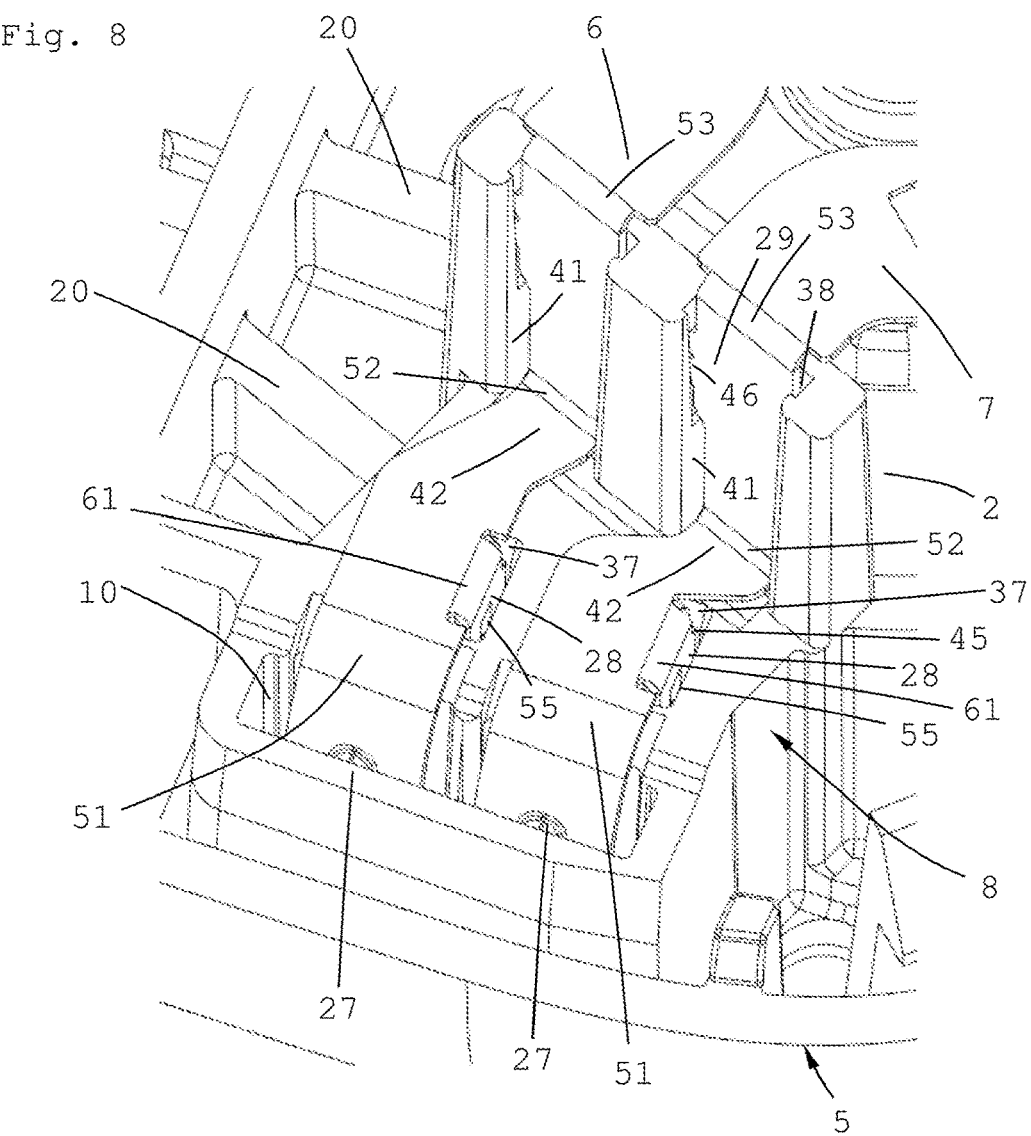
FIG. 8 is a partial view of mounted conductor stampings.

FIG. 8 is a partial view of conductor stampings 6, 7 mounted on the support plate 8. Pc-board contacts 27 are arranged in the pc-board insertion slot 10. First lugs 28 are inserted in first clamping pockets 37 and second lugs 29 are inserted in second clamping sockets 38. The conductor stampings are mounted top down. The conductor stampings 6, 7 have first bending edges 51, second bending edges 52, third bending edges 53 and fourth bending edges 54 (not shown, see FIG. 9). The first lugs 28 are arranged on a lateral bending edge 61 of each conductor stamping 6, 7, located between the first bending edge 51 and the second bending edge 52. The first lugs 28 are provided with a first hooks 55 and laterally sawtooth-like clamping means 45. Close to the second bending edge 52 the conductor stampings 6, 7 shows constrictions 42 which allows them to pass a bottleneck 41 of the second clamping pockets. Between the second bending edge 52 and the third bending edge 53 the second lugs 29 are slightly extended laterally and they are provided with sawtooth-like second clamping means 46 which are fixed by a form-fit connection in the second clamping pockets 38. On the other side of the support plate 8 the cover 5 is fixed to it.

Figure 9:
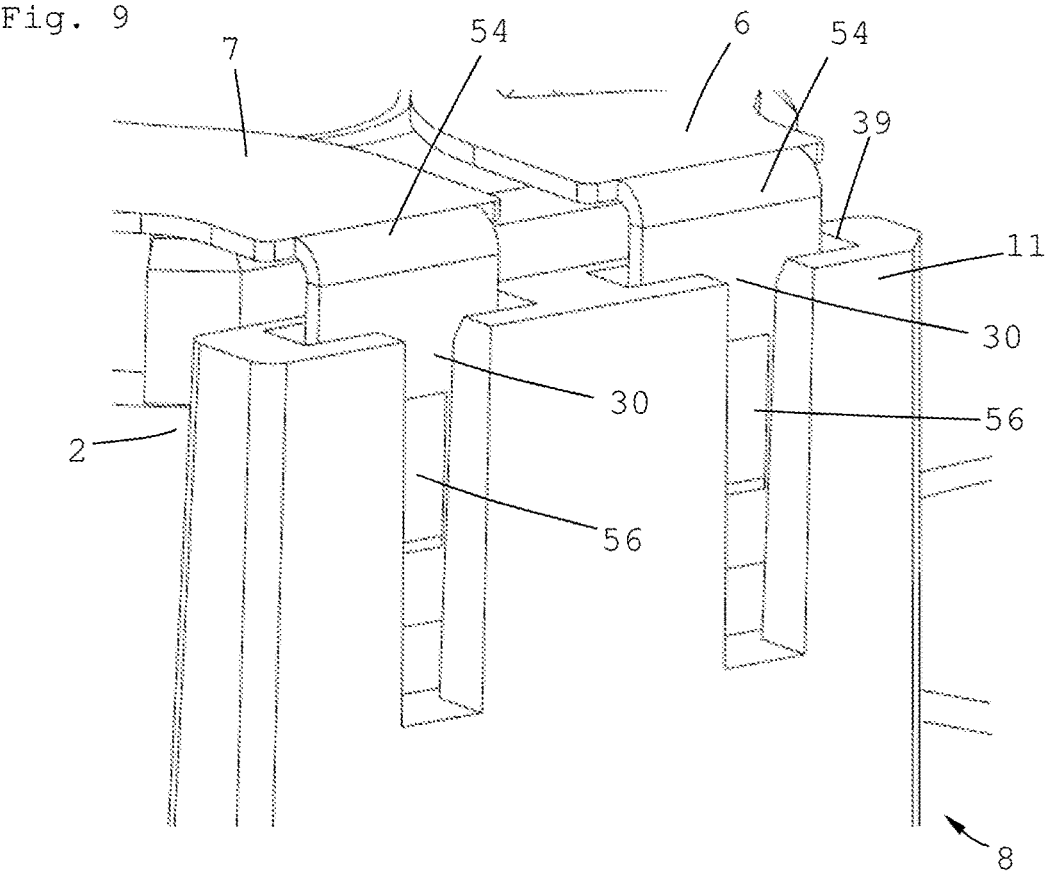
FIG. 9 is a further partial view of mounted conductor stampings.

FIG. 9 is a further partial view of mounted conductor stampings 6, 7, with a fourth bending edge 54, the third lugs 30, which are inserted into the third clamping pockets 39. The third lugs 30 are provided with second hooks 56 which fixes the third lugs 30. Further the support plate 8, the mounting projection 11 and the electric motor 2 is shown.

With reference to FIGS. 8 and 9, the conductor stampings 6, 7 have four bending edges 51, 52, 53, 54, wherein the first bending edge 51 is arranged close to the pc-board insertion slot 10, the second and the third bending edges 52, 53 are arranged close to the second clamping pocket 38 and the fourth bending edge is arranged close to the third clamping pocket 39. This shapes helps to adapt the conductor stampings 6, 7 to the shape of the support plate 8 and the electric motor 2.

To allow an easy mounting and the realization of a form fit, the conductor stampings 6, 7 have constrictions 42 at the second bending edge 52 and adjacent areas between the first lug 28 and the second bending edge 52, whereby the constrictions 42 are narrower than a bottleneck 41 or have the same width as the bottleneck 41. Therefore the constrictions 42 allows joining of the conductor stampings 6, 7 and the clamping means 46 generates a form fit within the clamping pockets 38.

That is why the clamping pocket 37 and/or the clamping pocket 38 and or the clamping pocket 39 has a T-shaped cross-section. Due to lack of space the first lug 28 of each conductor stamping 6, 7 is adjacent to a lateral bending edge 61. At this position they are inserted in first clamping pockets 37.

Apart from that the conductor stampings 6, 7 are equipped with motor contacts 26 and pc-board contacts 27. The pc-board contacts are sliding contacts. The motor contacts 26 are realized by clamping lugs.

For economical reasons it is intended that the mounting direction of the electric motor 2 is parallel to the mounting direction of the PC-board 43 and the mounting direction of the conductor stampings 6, 7.

A plurality of catches 12 are molded in one piece with the support plate 8. These catches 12 allows an easy mounting of an application unit. This may be a drug dispensing positive displacement pump or the like.

Figure 10:
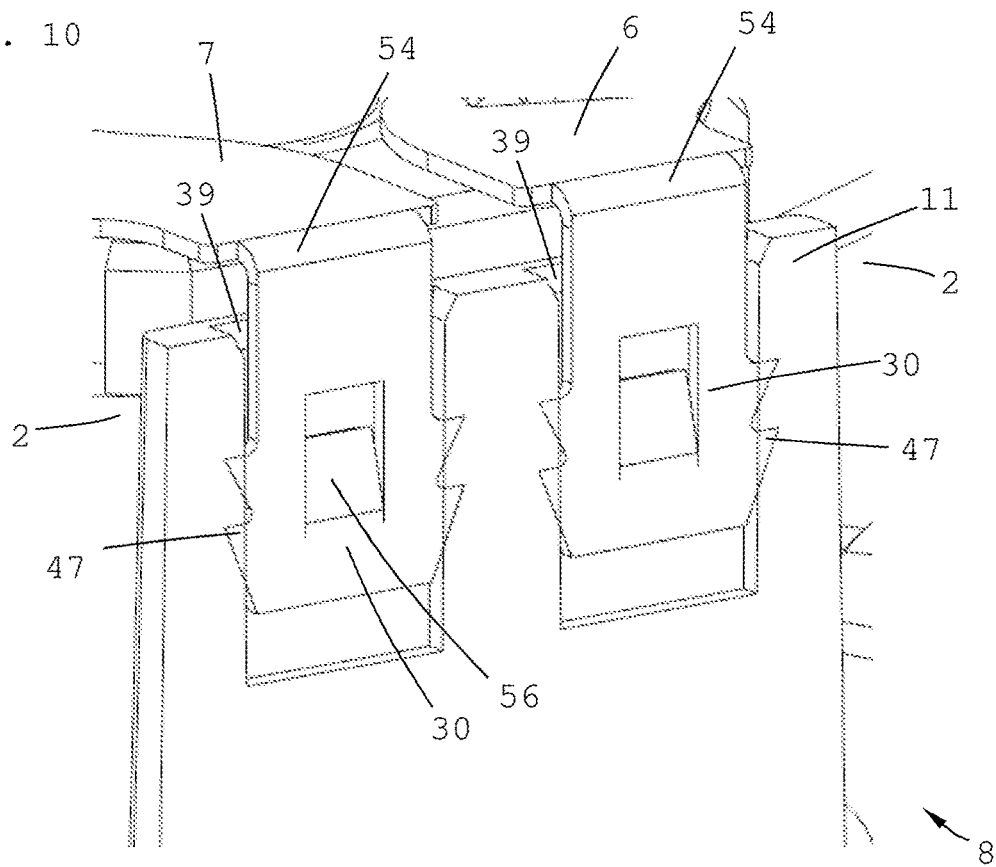
FIG. 10 is a sectional view of FIG. 9.

FIG. 10 is a sectional view of FIG. 9, with the support plate 8, the mounting projection 11, the electric motor 2, the conductor stampings 6, 7 the third clamping pockets 39, the third lugs 30, the second hooks 56 and third sawtooth-like clamping means 47, which are laterally extending and clamped within the third clamping pockets.

Figure 11:
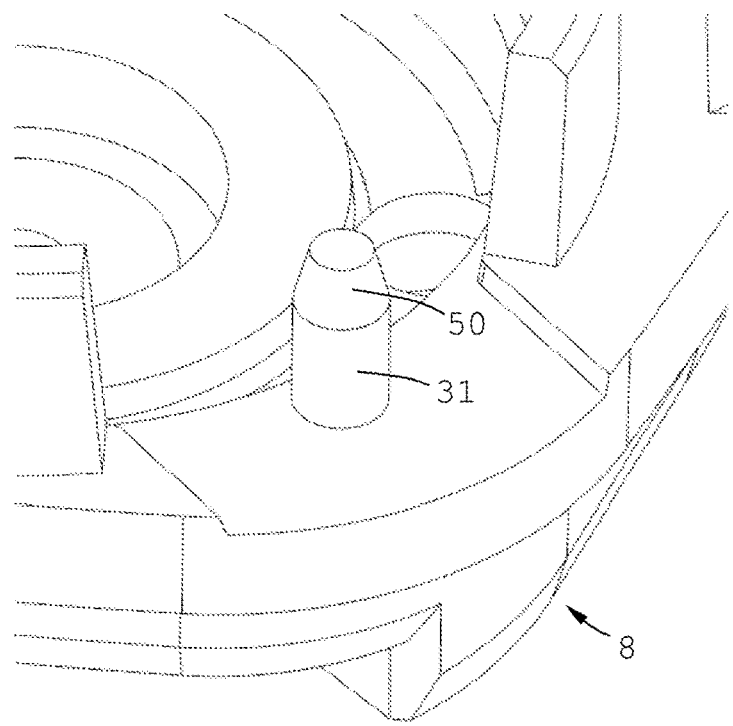
FIG. 11 is a partial view of the fastening post.

FIG. 11 is a partial view of the fastening post 31 as part of the support plate 8. The fastening post 31 has a conical head 50 which facilitates the mounting of the retaining washer.

Figure 12:
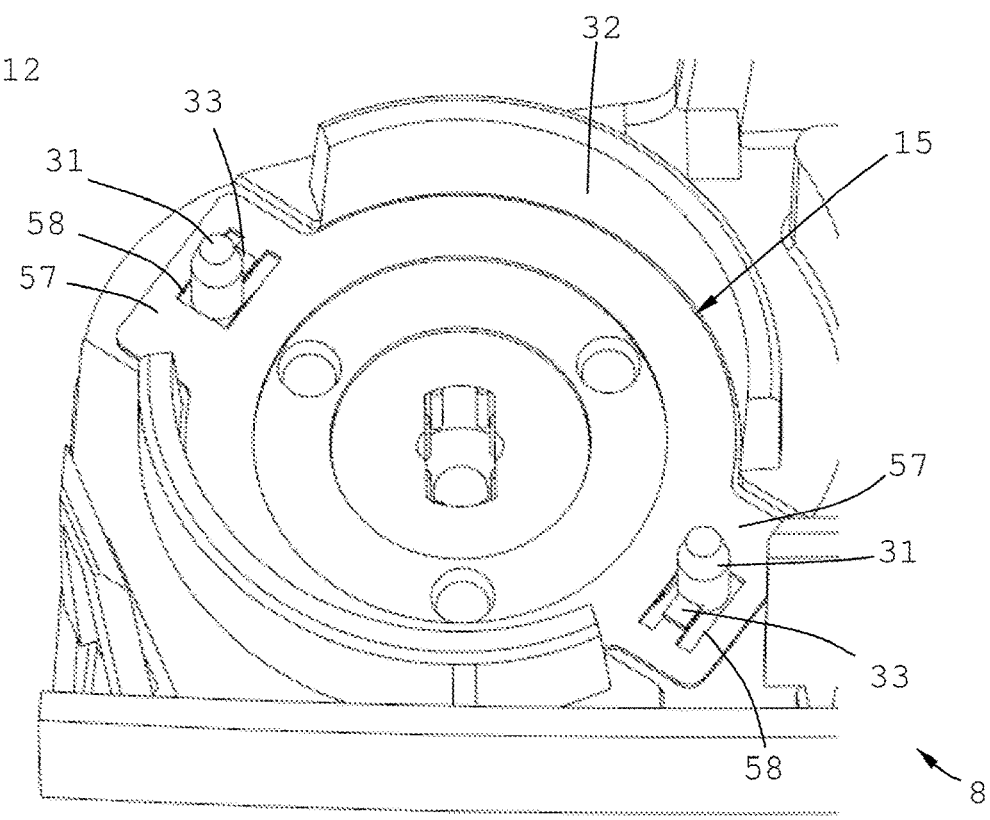
FIG. 12 is a partial view of a mounted output gear wheel.

FIG. 12 is a partial view of a mounted output gear 16, whereby the retaining washer 15 is mounted on the fastening post 31 of the support plate 8 and retains the output gear 16 in the third pocket 32. The retaining washer 15 has two lateral projections 57, with recesses 58 in it and clamping lugs 33 limiting the space of the fastening posts 31. The diameter of the fastening posts 31 is slightly greater than the built in space of the recess 58.

With reference to FIGS. 1 and 12, it is proposed that the retaining washer 15 has lateral projections 57 comprising recesses 58 and clamping lugs 33. The lateral projections 57 serves as stoppers to maintain a play between the output gear 16 and the retaining washer 15. The space between the clamping lug 33 and the facing part of the retaining washer is less than the diameter of the fastening post 31. This results in a self-reinforcing clamping effect. Further a cover 5 is mounted at the support plate 8 for enclosing the reduction gear 4k. The preferred joining process for this is ultrasonic welding, because this is a well-known method.

Figure 13:
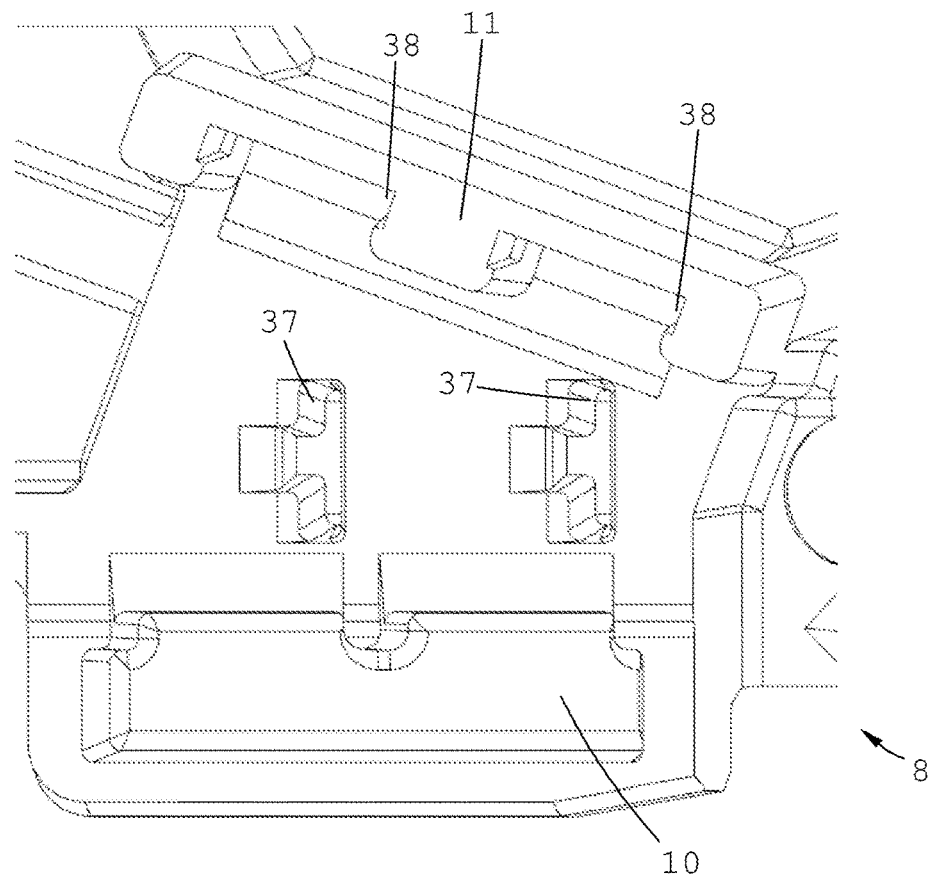
FIG. 13 is a partial view of a pc-board insertion slot.

FIG. 13 is a partial view of a pc-board insertion slot 10 within the support plate 8. Further the first clamping pockets 37 and the mounting projection 11 with the second clamping pockets 38 are shown.

Figure 14:
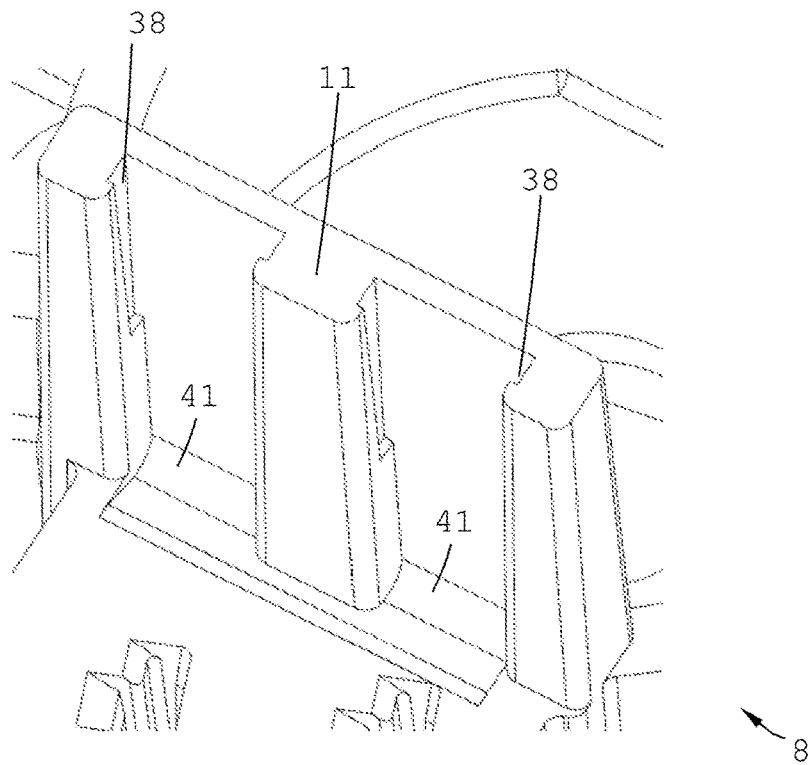
FIG. 14 is a partial view of a conductor stamping mounting slot.

FIG. 14 is a partial view of second conductor stamping clamping pockets 38, with the bottleneck 41 formed in the support plate 8.

Figure 15:
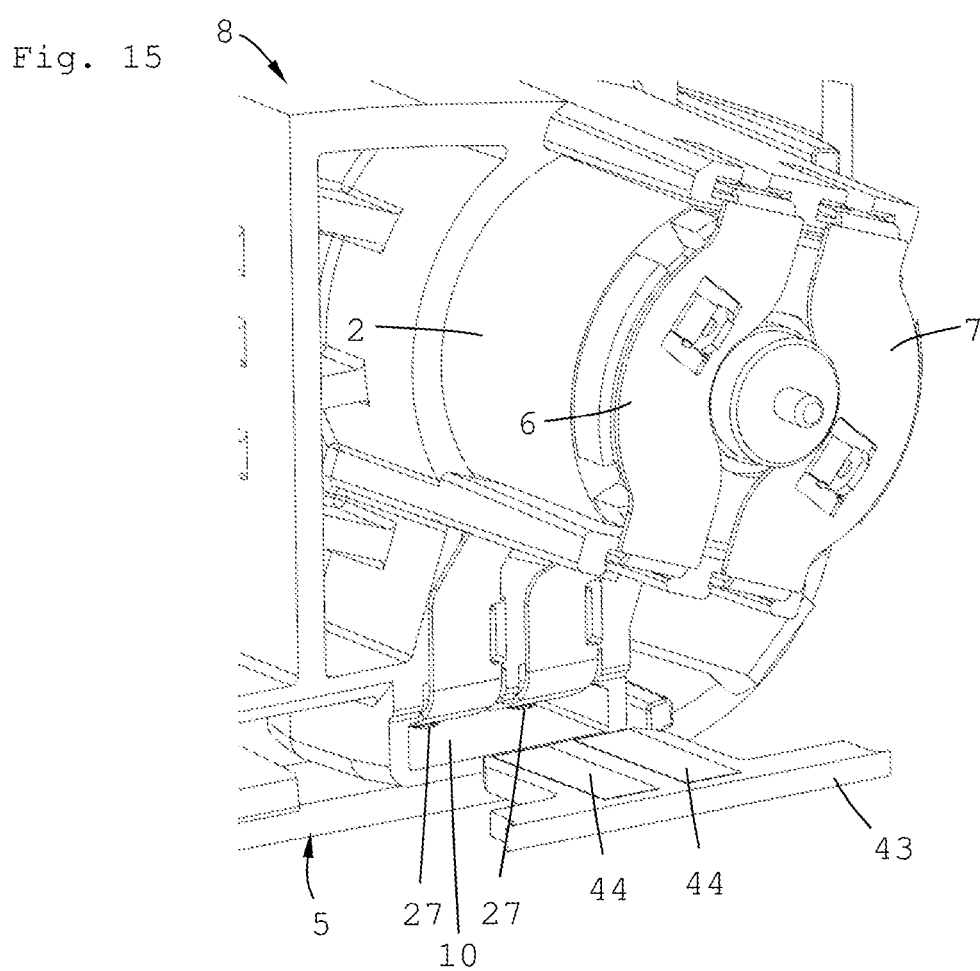
FIG. 15 is a partial view of a pc-board before mounting into the pc-board insertion slot.

FIG. 15 is a partial view of a pc-board 43 before mounting into the pc-board insertion slot 10, with the conductor stampings 6, 7 the pc-board contacts 27, the electric motor 2 and the cover 6. The pc-board is provided with pc-board contact areas 44.

Figure 16:
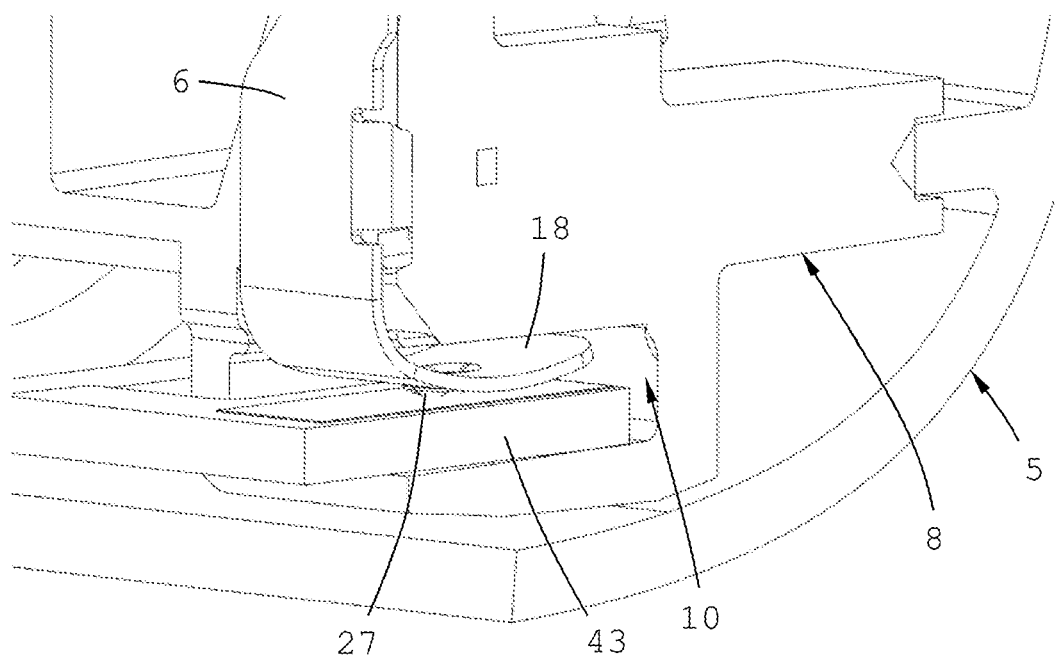
FIG. 16 is a sectional view of a mounted pc-board.

FIG. 16 is a sectional view of a mounted pc-board 43 in the pc-board insertion slot 10 of the support plate 8. The contact spring 18 is slightly bent by the pc-board 43, whereby each pc-board contact 27 is electrically connected to one of the pc-board contact areas (see FIG. 15). Further the cover 5 is shown.

Figure 17:
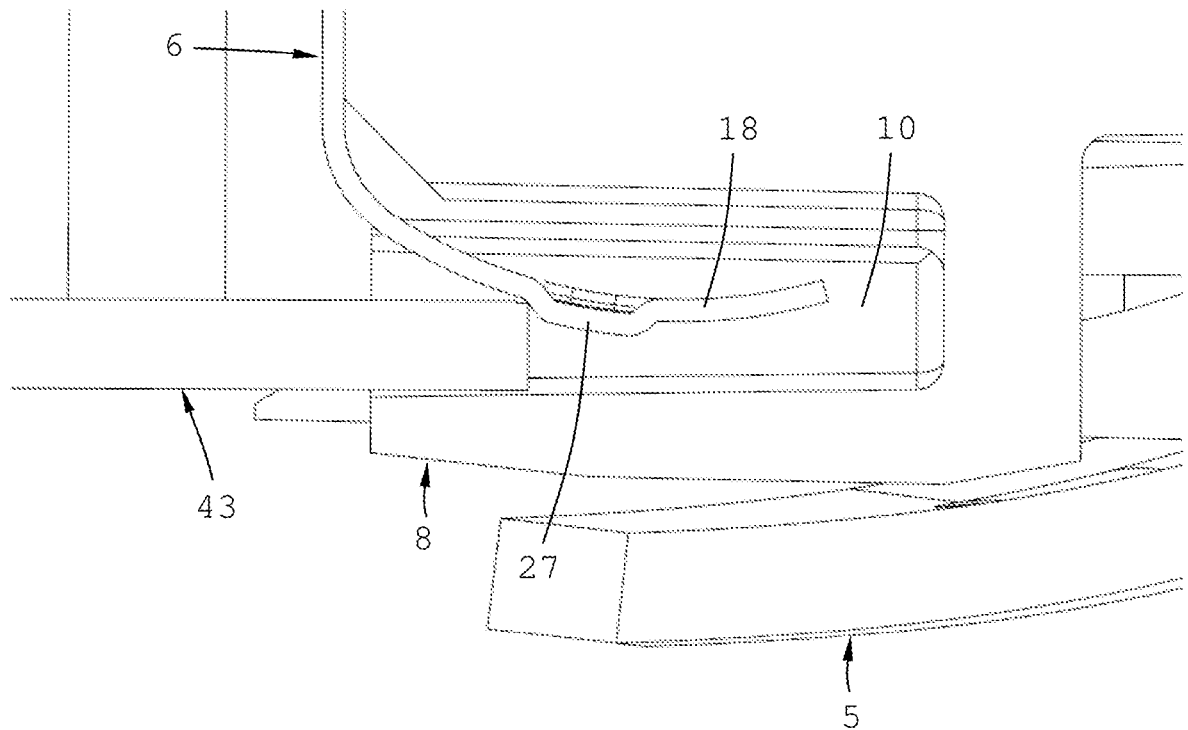
FIG. 17 is a sectional view of a pc-board before mounting into the pc-board insertion slot.

FIG. 17 is a sectional view of a pc-board 43 before mounting into the pc-board insertion slot 10, with the support plate 8, conductor stamping 6, contact spring 18, the pc-board contact 27 and the cover 5.

Figure 18:
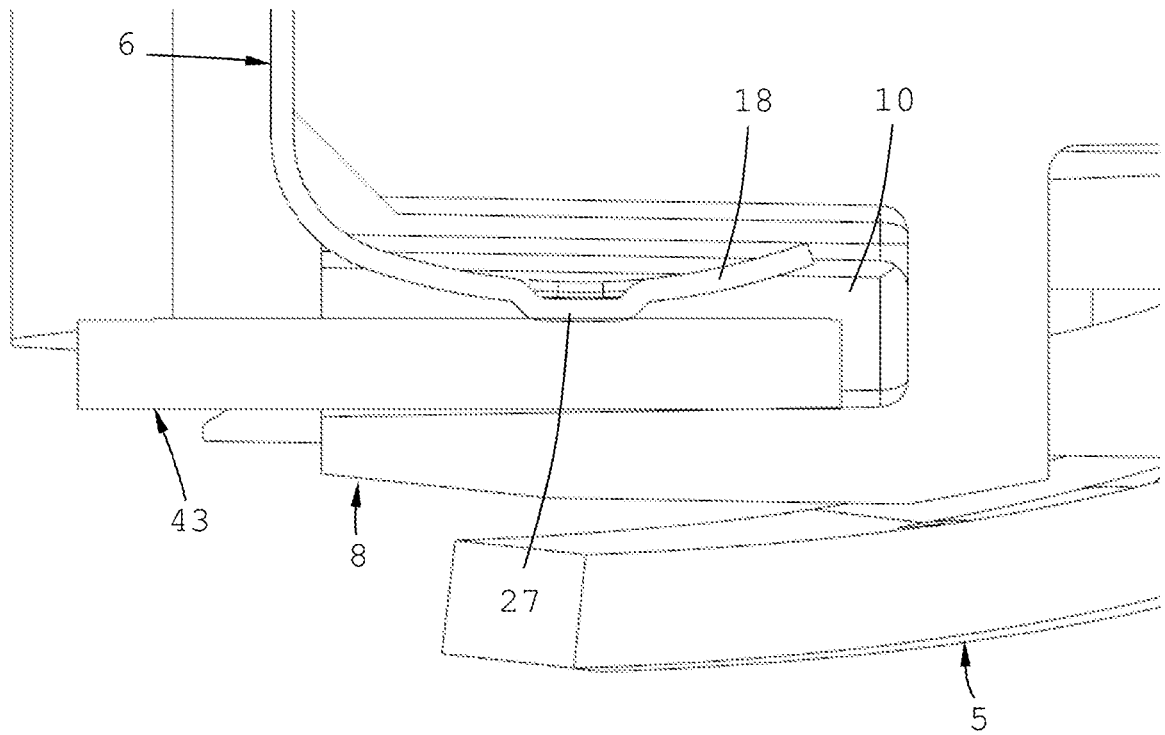
FIG. 18 is a further sectional view of the mounted pc-board.

FIG. 18 is a further sectional view of the mounted pc-board 43, with the support plate 8, the pc-board insertion slot 10, the conductor stamping 6, the contact spring 18, the pc-board contact 27 and the cover 5.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS 1 actuator unit
2 electric motor
3 terminal lug
4 reduction gear
5 cover
6 first conductor stamping
7 second condustor stamping
8 support plate
9 motor mounting pocket
10 PC-board insertion slot
11 mounting projection
12 catch
13 motor shaft passage
14 pinion
15 retaining washer
16 output gear
17 shaft
18 contact spring
19 main plane
20 reinforcing rib
21 first pocket
22 second pocket
23 compound worm wheel
24 first compound gear
25 second compound gear
26 motor contact
27 pc-board contact
28 first lug
29 second lug
30 third lug
31 fastening post
32 third pocket
33 clamping lug
34 pin reception
35 projecting pin
36 breakthrough
37 first clamping pocket
38 second clamping pocket
39 third clamping pocket
40 coupling socket
41 bottleneck
42 constriction
43 pc-board
44 pc-board contact area
45 first clamping means
46 second clamping means
47 third clamping means
48 motor shaft
49 end shield
50 conical head
51 first bending edge
52 second bending edge
53 third bending edge
54 fourth bending edge
55 first hook
56 second hook
57 lateral projection
58 recess
59 first side
60 second side
61 lateral bending edge

What is claimed is:

1. An actuator unit comprising:
a support plate having a first side and a second side;
an electric motor with terminal lugs and a motor shaft;
a motor mounting pocket on the first side, the motor mounting pocket accommodating the electric motor;
mounting projections on the first side, the mounting projections including a plurality of clamping pockets;
a PC-board insertion slot on the first side;
a motor shaft passage from the first side to the second side;
the motor shaft of the electric motor projecting from the first side through the shaft passage to the second side and carrying a pinion;
a multistage reduction gear arranged on the second side and meshing with the pinion; and
a plurality of conductor stampings fixed in the clamping pockets and connected with the terminal lugs of the electric motor.

2. The actuator of claim 1, further comprising:
an output gear on the first side;
a pocket with a breakthrough on the support plate for accommodation of the output gear on the first side, the output gear meshing with the reduction gear arranged on the second side of the support plate.

3. The actuator of claim 2, wherein the support plate has mounting means on the first side for holding the output gear in the pocket.

4. The actuator of claim 3, further comprising a retaining washer that is fixed in place by the mounting means.

5. The actuator of claim 4, wherein the mounting means comprises fastening posts that are molded in one piece with the support plate on the first side.

6. The actuator of claim 4, wherein the retaining washer has lateral projections constituting recesses and clamping lugs.

7. The actuator of claim 1 wherein a cover is mounted on the support plate for enclosing the reduction gear.

8. The actuator of claim 1, wherein the conductor stampings are equipped with lugs inserted into the clamping pockets.

9. The actuator of claim 8, wherein the lugs are equipped with clamping means and/or hooks.

10. The actuator of claim 9, wherein the clamping means are arranged lateral and the hooks are arranged between the clamping means.

11. The actuator of claim 9, wherein the clamping means have a sawtooth-like outline.

12. The actuator of claim 8, wherein the conductor stampings have four bending edges, wherein the first bending edge is arranged close to the pc-board insertion slot, the second and the third bending edges are arranged close to the second clamping pocket and the fourth bending edge is arranged close to the third clamping pocket.

13. The actuator of claim 12, wherein the conductor stampings have constrictions at the second bending edge and adjacent areas between the first lug and the second bending edge, whereby the constrictions are narrower or have the same width as a bottleneck defined at the second bending edge.

14. The actuator of claim 8, wherein at least one of the clamping pockets has a T-shaped cross-section.

15. The actuator of claim 8, wherein the first lug of each conductor stamping is adjacent to a lateral bending edge.

16. The actuator of claim 1, wherein the conductor stampings have motor contacts and pc-board contacts.

17. The actuator of claim 1, wherein the mounting direction of the electric motor is parallel to the mounting direction of the PC-board and the mounting direction of the conductor stampings.

18. The actuator of claim 1, further comprising a plurality of catches molded in one piece with the support plate.

\* \* \* \* \*